United States Patent [19]
Dockser

[11] Patent Number: 5,815,422
[45] Date of Patent: Sep. 29, 1998

[54] COMPUTER-IMPLEMENTED MULTIPLICATION WITH SHIFTING OF PATTERN-PRODUCT PARTIALS

[75] Inventor: Kenneth A. Dockser, San Jose, Calif.

[73] Assignee: VLSI Technology, Inc., San Jose, Calif.

[21] Appl. No.: 789,156

[22] Filed: Jan. 24, 1997

[51] Int. Cl.$^6$ .................................. G06F 7/52; G06F 7/00
[52] U.S. Cl. ..................................... 364/754.01; 364/746.2
[58] Field of Search .............................. 364/754.01, 757, 364/759, 760.01, 746.2

[56] References Cited

U.S. PATENT DOCUMENTS

| | | | |
|---|---|---|---|
| 4,679,164 | 7/1987 | Rearick | 364/754.01 |
| 4,866,654 | 9/1989 | Yamada | 364/757 |
| 5,159,567 | 10/1992 | Gobert | 364/757 |
| 5,424,971 | 6/1995 | Yang et al. | 364/757 |
| 5,600,569 | 2/1997 | Nishiyama et al. | 364/757 |
| 5,703,802 | 12/1997 | Tsubata et al. | 364/760.01 |

OTHER PUBLICATIONS

Koren, Israel, *Computer Arithmetic Algorithms*, Prentice–Hall, Inc., Englewood Cliffs, N.J., 1993, pp. 99–111.

*Primary Examiner*—Tan V. Mai
*Attorney, Agent, or Firm*—Clifton L. Anderson

[57] ABSTRACT

A constant multiplication device is designed for multiplying a received binary multiplicand by a constant multiplier which, when expressed in binary or signed-digit notation, includes a repeated pattern with three or more non-zero values. The device includes a pattern-product term generator that receives the multiplicand and generates terms corresponding to each of the non-zero values of the pattern. If, when all instances of the pattern are subtracted from the multiplier there are non-zero values in the difference, the pattern-product term generator can also generate remainder-product terms. The pattern-product terms, but not the remainder-product terms, are input to a pattern compressor that yields pattern-product partials; the compressor can be a carry-save adder and the partials can be in the form of a pseudo sum and a pseudo carry. A replica generator generates shifted replicas of each pattern-product partial. The replicas are input to a replica compressor, as are any remainder-product terms. The replica compressor converts these inputs to final-product partials. The replica compressor can be a carry-save adder and the final-product partials can be a pseudo sum and a pseudo carry. These are input to a product ripple accumulator, which can be a carry-propagate adder, to yield the product of the multiplicand and the multiplier. Since there is only one ripple stage, the device provides for relatively high-speed multiplication for multipliers with repeated patterns.

5 Claims, 4 Drawing Sheets

COMPUTER-IMPLEMENTED MULTIPLICATION WITH SHIFTING OF PATTERN-PRODUCT PARTIALS

BACKGROUND OF THE INVENTION

The present invention relates to data processing and, more particularly, to computer-implemented multiplication. A major objective of the present invention is to enhance data processing throughput by streamlining multiplication by certain constant multipliers.

Computers, broadly defined to include computational electronic devices, have changed our society by automating formerly labor intensive tasks and by making practical many tasks that heretofore were impracticable. While general purpose computers have achieved the greatest visibility, special purpose computers such as embedded controllers (e.g., in automobiles and cameras) and digital signal processors (e.g., in digital audio/visual equipment) have become even more ubiquitous. However, no sooner do computers meet some need then appetites are whetted for further capabilities, e.g., collaborative video over phones connected to the Internet.

Computers achieve their prowess mainly by executing large numbers of relatively simple tasks at high speed. Complex computational tasks are reduced to basic logico-mathematical constituents. Even basic arithmetic operations are simplified further. Computations are performed in binary format, in which numbers are expressed as strings with only two values—0 and 1, minimizing the number of combinations that must be considered for each operation.

Multiplication benefits from this binary format. Multiplication, involves the generation of partial products and the accumulation of the partial products. When the multiplicand and multiplier are in binary format, all partial products are either 0 or a shifted replica of the multiplicand. The partial products can then be added-with-carry pair-wise one bit position at a time so that only eight combinations (2 for the first addend×2 for the second added×2 for the carry) of addends and carry need be considered instead of the two hundred (10×10×2) possible combinations for digit-by-digit pair-wise addition-with-carry of decimal numbers. While a given binary multiplication can involve thousands of bit-sized operations, computers can perform up to millions of such operations per second so that computational throughput can be impressive.

Greater computational throughput in the future is virtually assured through the development of faster computers. However, within any given generation of hardware, there is still a need to optimize multiplication throughput, reduce circuit size, or both. One approach to increasing throughput and reducing size is to streamline multiplication by minimizing the number of partial products that must be generated and thus the number of simple arithmetic operations that must be performed by a given multiplier.

In a "zero-omission" method of reducing the number of partial products, 0s in the multiplier are located and the corresponding partial products are not generated or accumulated. An example of this approach is provided in U.S. Pat. No. 5,424,971 to Yang et al. The effectiveness of the zero-omission method depends on the multiplier. The best case is a multiplier with only 0s, in which case no partial products are generated or accumulated. The effectiveness of the zero-omission method decreases with an increasing percentages of 1s in the multiplier. In the worst case of a multiplier with all 1s, the zero-omission method affords no reduction of partial products.

In many cases, further reductions in the number of partial products can be achieved where partial products can be subtracted as well as added. For example, the multiplier 111100 requires four partial products if only addition is employed. However, as indicated by the equivalence $111100 = 2^6 - 2^2$, only two partial products and thus one simple arithmetic operation (i.e., addition, subtraction) are required if subtraction is allowed.

If a binary-coded number is re-expressed in signed-digit code, the associated number of partial products is readily determined. In addition to values of 0 and 1, signed digit notation permits values of −1, typically written as $\bar{1}$ to be used at any digit position. Thus, binary 111100 equals signed digit $100\bar{1}00$. It is clear from this expression that two partial products are required and that the partial product corresponding to the third least significant digit position is to be subtracted from the partial product corresponding to the most significant bit position.

There can be many alternative signed digit expressions of a number. The one with the fewest digit positions with non-zero values corresponds to the least number of partial products. Canonical recoding yields a "minimum signed digit code", i.e., a signed digit expression with the smallest possible number of non-zero values. Thus, it has been proposed that a canonically recoded expression of a multiplier corresponds to the least number of add/subtract operations required for accumulating partial products generated by that multiplier. (See *Computer Arithmetic Algorithms* by Israel Koren, Prentice-Hall, Inc., 1993, pp. 103–104.)

However, further reductions are obtainable by finding repeated patterns in the multiplier. Thus, the product M*K of a multiplicand M and a multiplier K can be expressed as M*K=P*Q+R where P is a repeated pattern, Q indicates the places at which the repeated pattern is repeated, and R is the remainder M*K−P*Q. For example, non-zero values not included in any instance of a pattern lead to a non-zero remainder; in some cases, R can be zero.

In a patent application entitled "Computer-Implemented Multiplication with Multipliers Having Repeated Patterns" Ser. No. 08/789,151 by the present inventor and filed on the same day as this application, it is proposed to compute a pattern product and then use the computed pattern product (along with any remainder) to compute the desired final product. As the present invention demonstrates, it is not necessary to fully compute the pattern product. In fact, there can be improvements in computational speed when this is not done.

SUMMARY OF THE INVENTION

The present invention provides a constant multiplication device for constant multipliers having a repeating pattern with at least three non-zero values. The device includes a pattern-product term generator, a pattern-product compressor, a pattern-partial replica generator, a replica compressor, and a ripple accumulator. The pattern-product term generator and the replica generator can be implemented in some cases as data routings. Preferably, the compressors are carry-save adders and the ripple accumulator is a carry-propagate adder. However, the invention provides for other arithmetic operators, such as subtractors used as compressors.

Preferably, the repeated pattern is found in a multiplier K expressed in binary or signed digit notation. Such a number can be expressed as K=(P*Q)+R, where P is the repeated pattern, Q is the repetition pattern over which pattern P repeats, and R is a remainder term. The invention applies where the main pattern P includes at least three non-zero values, i.e., a leading non-zero value, a trailing non-zero value, and at least one intermediate non-zero value. The repetition pattern Q is required to have at least two non-zero values (otherwise, there is no repetition of the main pattern).

A pattern can be made up of any series of digits in the expression of a number. For example, in 1101001101, the pattern 1101 repeats. In this case, 1101 is the repeated pattern and 1000001 is the pattern over which repetition occurs. In this case, the pattern consists of a contiguous string of digits. However, non-contiguous patterns are provided for as well. For example, in 1101001111, the non-contiguous pattern 11-1 repeats.

In 1101001101, instances of the pattern 1101 are non-intersecting (less precisely characterized elsewhere as non-overlapping). However, in 1101101, two instances of the pattern 1101 share the middle digit. The invention provides for patterns with both intersecting and non-intersecting instances. In the signed digit expression 110$\overline{1}$00$\overline{1}$101, the instances of the pattern 110$\overline{1}$ are inverted with respect to each other. The invention provides for both inverted and uninverted instances of a pattern. The expression 1101001101001100 can be considered has having two complete instances of the pattern 1101 and one incomplete instance of the pattern 1101 (1100). The invention provides for incomplete instances of a pattern provided there are two complete instances of the pattern.

The remainder R is simply K−(P*Q). A remainder occurs when there are non-zero values of the multiplier not included in any instance of the repeated pattern. A remainder can also occur where instances of a pattern intersect or there is an incomplete instance of a pattern.

A compressor, as the term is used herein, has at least three inputs and the number of outputs is at least two and less than the number of inputs. Each input and output can have multiple bit positions. The outputs should collectively preserve some collective property of the inputs, typically the sum. Typical compressors include 3:2 full adders and 4:2 full adders (the latter is typically equivalent to two stages of 3:2 full adders). Advantageously, the adders can be carry-save adders so that there is no propagation along bit positions. The lack of propagation or ripple at the compressors is the main factor in the speed advantage provided by the present invention.

The present invention uses a pattern-product compressor to compress the expression M*P, where M is the multiplicand and P is the repeated pattern. Since P is required to have at least three non-zero values, there are at least three inputs to the pattern compressor. The outputs of the compressor are pattern partial products, preferably, a "pattern" pseudo-sum and a "pattern" pseudo-carry.

The pattern partial products are input to the pattern-partial replica compressor. Each partial-product is subject to at least one replication and shift before being input to the replica compressor so that there are at least four inputs to the replica compressor. Remainder products of the form M*R can also be input to the replica compressor. The replica compressor provides final product partials; preferably, it includes carry-save adders and provides "replica" pseudo-sum and "replica" pseudo-carry terms as outputs.

The outputs of the replica compressor are input to a ripple accumulator which is a carry-propagate adder. The ripple accumulator has a single output for the product M*K. While this final computational stage may require rippling between bit positions, the compressor computational stages need not. Accordingly, computational speed is enhanced relative to multiplication devices with two or more stages of rippling. In addition, device area is saved in many cases relative to devices that do not take advantage of repeated patterns. These and other features and advantages of the invention are apparent from the description below with reference to the following drawings.

DESCRIPTION OF THE PREFERRED EMBODIMENTS

Figure 1:
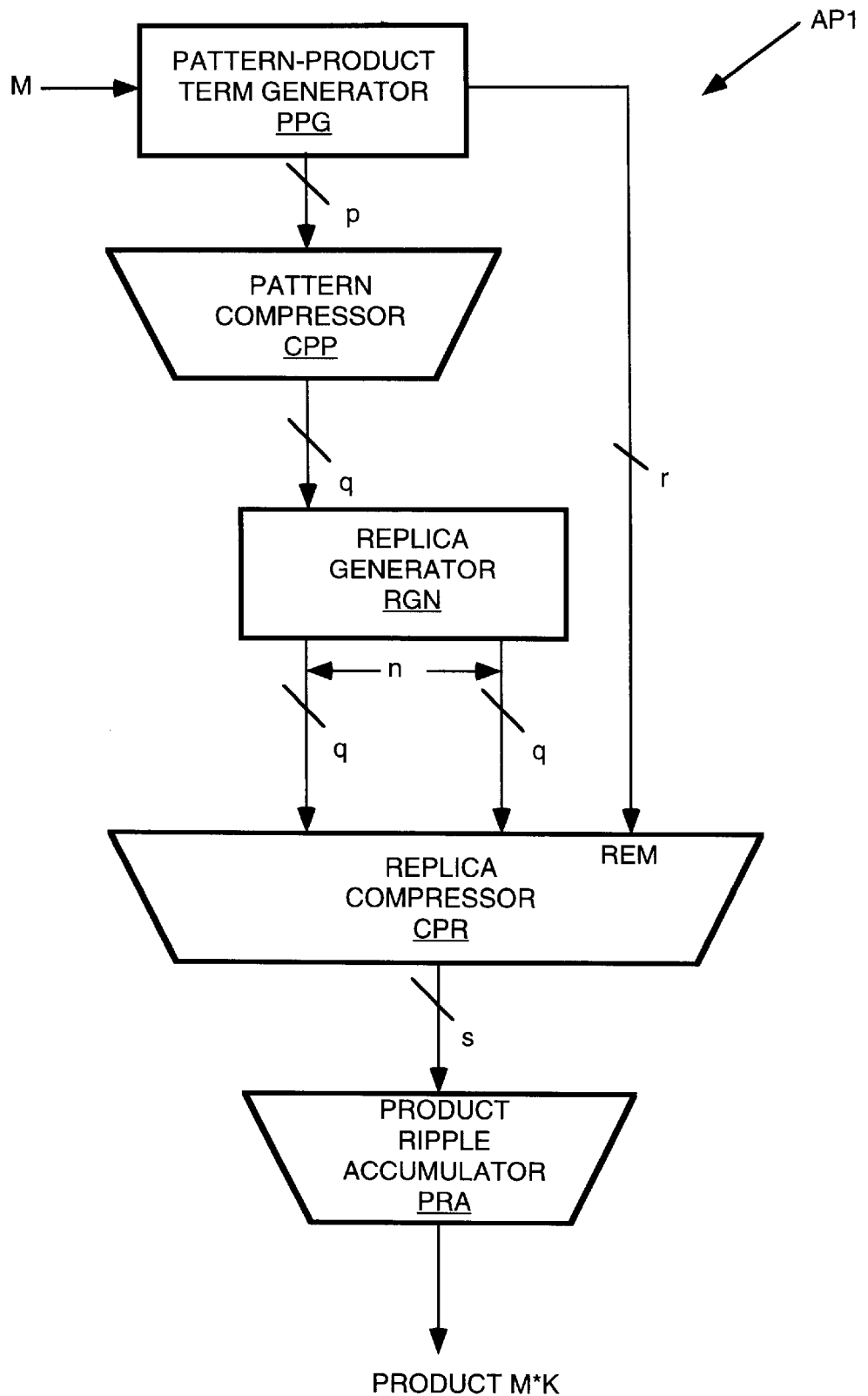
FIG. 1 is a schematic illustration of a generalized constant multiplication device in accordance with the present invention.

A constant multiplication device AP1 comprises a pattern-product term generator PPG, a pattern compressor CPP, a replica generator RGN, a replica compressor CPR, and a product ripple accumulator PRA, as shown in FIG. 1. Constant multiplication device AP1 is designed to output the product M*K, where K is a constant multiplier and M is a received multiplicand.

Pattern-product term generator PPG receives multiplicand M at its input. For each of p non-zero values in a repeated pattern P of multiplier K, generator PPG outputs a respective pattern product term. Where all non-zero digits of pattern P are 1s, the pattern products can be shifted replicas of M. Where pattern P includes one or more $\overline{1}$s, the relation between multiplicand M and the pattern-product terms is more complex, as described subsequently. For the case that M*K−P*Q=R≠0, generator PPG also generates remainder-product terms for each of r non-zero digits of remainder R.

Pattern compressor CPP receives the pattern-product terms (but not the remainder-product terms) as inputs. The pattern is required to have p≧3 non-zero values, so there are p≧3 inputs to pattern compressor CPP. Compressor CPP converts these inputs to q pattern-product partials, where 2≦q≦p. In other words, there must be at least two product partials (if there were only one, it would not be a "partial"), and the number q of partials must be less that the number of pattern-product terms (otherwise there is no compression). The requirement that q≦p must apply to some, but not necessarily all, digit positions input to compressor CPP. A compressor is typically constituted by carry-save adders. However, those skilled in the art can devise other devices, e.g., hybrid adder/subtractors, that provide suitable partials.

The pattern-product partials are input to replica generator RGN, which generates n shifted replicas of each partial. The number n of replicas is equal to the number of instance of the repeated pattern in the multiplier. The replicas are input to replica compressor CPR. Also input to replica compressor at input REM are any remainder-product terms from pattern product generator PPG. In the event that the repeated pattern is a subpattern of an incorporating repeated pattern, another replica generator and another compressor can be used to generate another level of partials. These can be considered as stages of replica compressor CPR. In this case, there can be two levels of remainders, each level being associated with a respective stage compressor.

The replica compressor converts its n*q+r inputs and converts them to s final-product partials. Typically s=2 and the partials are a pseudo sum and a pseudo carry. The product ripple accumulator accumulates the final product partials (rippling where necessary) to yield the final product M*K. In general, the ripple accumulator is a carry-propagate adder and it is carries that are rippled.

Herein, the term "ripple accumulator" refers to any type of arithmetic unit in which the result at one digit position can propagate across the result to affect other digit positions. Likewise, the term "carry-propagate adder" refers to any type of adder that allows carries to propagate across the width of the result. Accordingly, fast adders such as carry-look ahead and carry skip adders, which are know to those skilled in the art, are encompassed by these terms. "Ripple accumulator" also encompasses other types of propagation, such as a a borrow-propagate subtractor.

Figure 2:
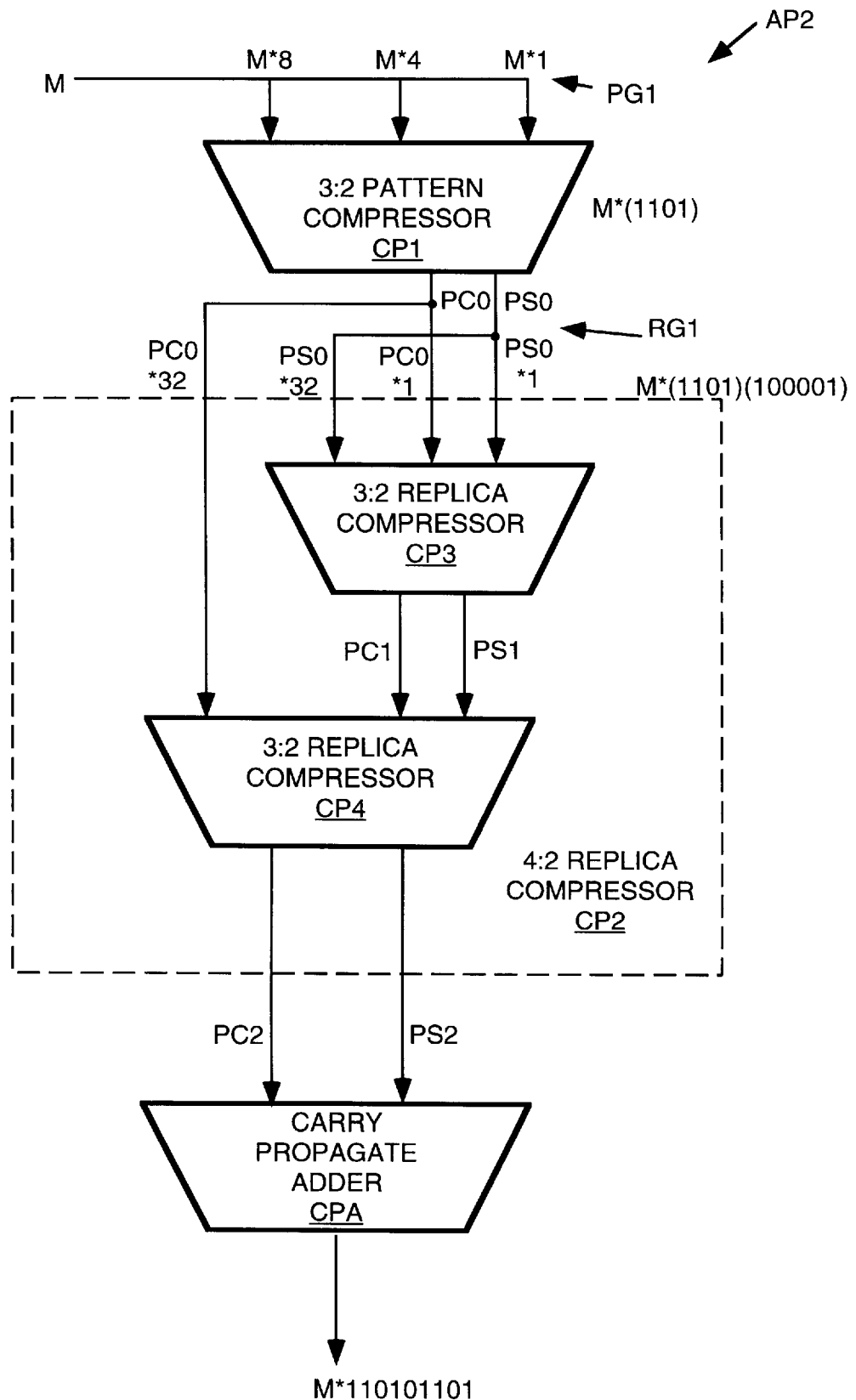
FIG. 2 is a schematic illustration of a constant multiplication device for the multiplier 110101101 in accordance with the present invention.

Another constant multiplication device AP2, shown in FIG. 2, is designed to multiply a received binary multiplicand by a constant multiplier K=110101101, which includes a repeated pattern P=1101 and no remainder. Pattern-product term generator PG1 routes multiplicand M to three different inputs of pattern compressor CP1. Pattern compressor CP1 has two outputs: a pseudo sum PS0 and a pseudo carry PC0. Thus, compressor CP1 is a 3:2 compressor, including 3:2 carry-save adders at some bit positions; however, some bit positions may require only half adders or no adders at all. The operation of compressor CP1 when the multiplicand is M=10101 is indicated by the following Table I.

TABLE I

| M*1 | | | | | | 1 | 0 | 1 | 0 | 1 |
|---|---|---|---|---|---|---|---|---|---|---|
| M*4 | | | 1 | 0 | 1 | 0 | 1 | (0) | (0) | |
| M*8 | | 1 | 0 | 1 | 0 | 1 | (0) | (0) | (0) | |
| PS0 | | 1 | 1 | 1 | 0 | 1 | 0 | 0 | 1 | |
| PC0 | (0) | (0) | (0) | 1 | 0 | 1 | 0 | 0 | (0) | |

Replica generator RG1, like pattern generator PG1, consists of routings to compressor inputs. Replica generator "generates" PS0*1, PC0*1, PS0*32, and PC0*32. The 1 and the 32 correspond to the two instances of the pattern P=1101 in K=110101101. These four replicas are input to a 4:2 replica compressor CP2, which is (in this case) constituted by a series of two 3:2 replica compressors CP3 and CP4. The operation of compressor CP3 for multiplicand 10101 is indicated by the following Table II.

TABLE II

| PS0*1 | | | | | 1 | 1 | 1 | 0 | 1 | 0 | 0 | 1 |
|---|---|---|---|---|---|---|---|---|---|---|---|---|
| PC0*1 | | | | | 0 | 0 | 0 | 1 | 0 | 1 | 0 | 0 | 0 |
| PS0*32 | 1 | 1 | 1 | 0 | 1 | 0 | 0 | 1 | (0) | (0) | (0) | (0) | (0) |
| PS1 | 1 | 1 | 1 | 0 | 1 | 1 | 1 | 0 | 0 | 0 | 0 | 1 |
| PC1 | (0) | (0) | (0) | (0) | (0) | (0) | (0) | 1 | 0 | 1 | 0 | 0 | 0 | (0) |

3:2 compressor CP4 combines the outputs of compressor CP3 with shifted pseudo carry PS0*32 as indicated in Table III. The bottom row of Table III shows the result of carry-propagate adder CPA. A conversion to decimal notation confirms the result M*K=21*429=9009.

TABLE III

| PS1 | 1 | 1 | 0 | 1 | 1 | 1 | 1 | 0 | 0 | 0 | 0 | 1 |
|---|---|---|---|---|---|---|---|---|---|---|---|---|
| PC1 | | | | | | 1 | 0 | 1 | 0 | 0 | 0 | 0 |
| PC0*32 | | 1 | 0 | 1 | 0 | 0 | 0 | (0) | (0) | (0) | (0) | (0) |

TABLE III-continued

| PS2 | 1 | 1 | 0 | 0 | 0 | 1 | 0 | 1 | 1 | 0 | 0 | 0 | 1 |
|---|---|---|---|---|---|---|---|---|---|---|---|---|---|
| PC2 | (0) | (0) | 1 | 0 | 1 | 0 | 1 | 0 | 0 | 0 | 0 | 0 | (0) |
| M*K | 1 | 0 | 0 | 0 | 1 | 1 | 0 | 0 | 1 | 1 | 0 | 0 | 1 |

Figure 3:
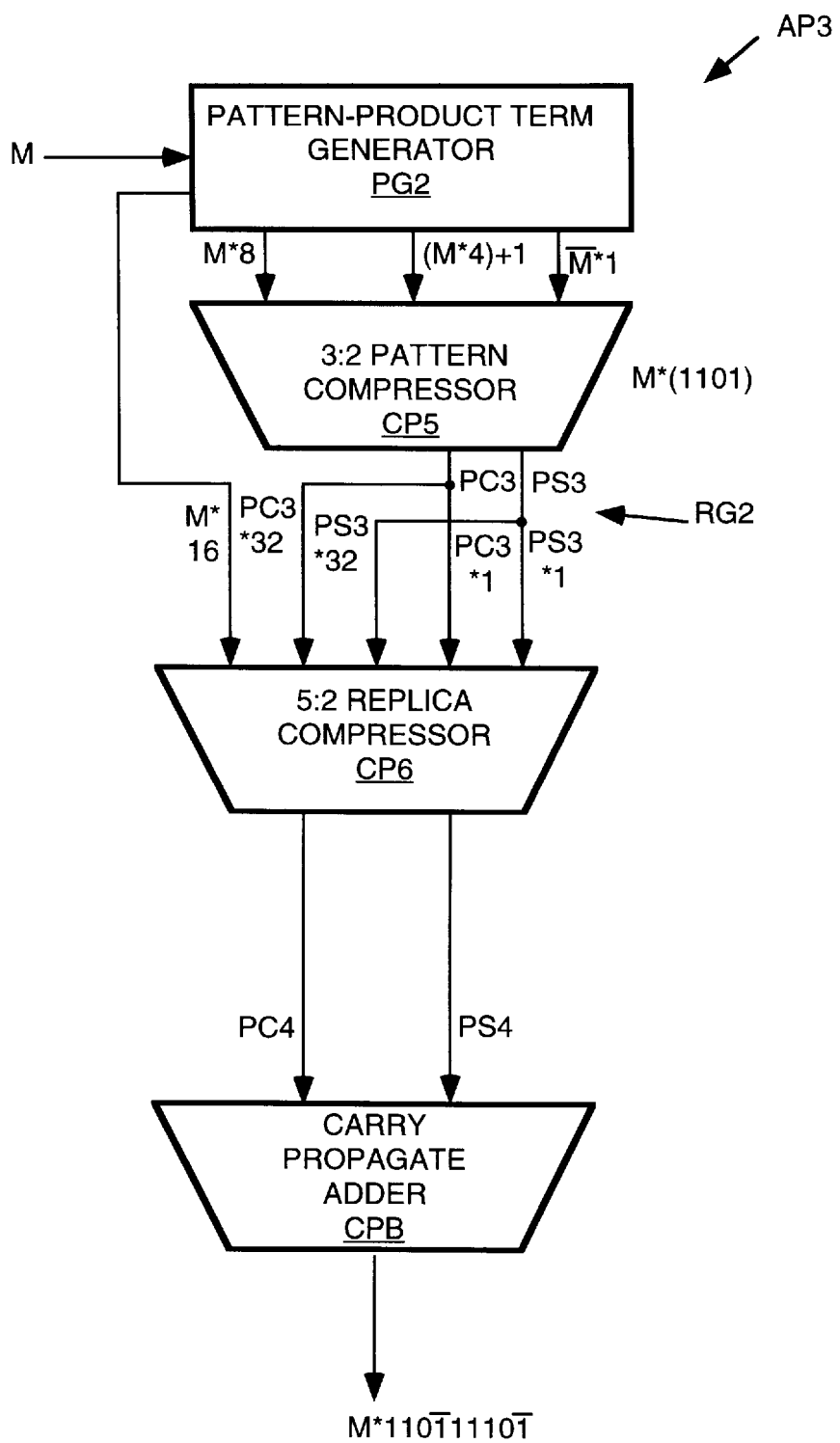
FIG. 3 is a schematic illustration of a constant multiplication device for the multiplier 110$\overline{1}$1110$\overline{1}$ in accordance with the present invention.

A third constant multiplication device AP3, shown in FIG. 3, multiplies a received multiplicand by K=379, which can be expressed in signed digit notation as 110$\overline{1}$1110$\overline{1}$. In this case, the pattern 110$\overline{1}$ is repeated, so the equation of interest is 110$\overline{1}$1110$\overline{1}$=P*Q+R=(110$\overline{1}$)(100001)+10000. To illustrate the operation of constant multiplication device AP3, the example of M=10101 is used again.

Since the signed digit expression includes negative values, subtraction is indicated for combining pattern-product terms. However, to use a more conventional pattern compressor composed of adders, a two's complement is added. To obtain the two's complement, each bit of the multiplicand M must be changed (i.e., inverted) and unity must be added to the result. However, for multiplicands that end in zero, the inverse ends in one; adding unity generates a carry. In many cases, to avoid this extra carry operation, unity can be added elsewhere, e.g., to another pattern-product term that ends in zero. Since the pattern-product terms are shifted relative to each other with the LSBs being zero-filled, it is generally the case that another pattern product will end in zero. Where this trick is unavailable, the unity can constitute an additional term to be compressed.

In device AP3, pattern-product term generator PG2 generates the inverse of M: $\overline{M}$=(0)1010=$\overline{M}$*1, which is used as one input to pattern compressor CP5. Generator PG2 also generates the term M*4 and adds unity to the M*4 term to yield 1010101 as a second input to compressor CP5. Also, generator PG2 generates the term M*8=10101000 as the third and final input to compressor CP5. 3:2 pattern compressor CP5 generates from these three inputs a pseudo sum PS3 and a pseudo carry PC3.

Shifted replicas PS3*1, PS3*32, PC3*1, PC3*32 are generated by replica generator RG2, which is basically the routing from the outputs of compressor CP5 to inputs of compressor CP6. In addition, remainder-product term M*R= 101010000 is input to compressor CP6. Thus, replica compressor CP6 has five inputs, making it a 5:2 compressor. Compressor CP6 can be implemented as a series of three 3:2 compressors. It outputs a pseudo sum PS4 and a pseudo carry PC4. These are added by carry-propagate adder CPB to yield the product M*K.

Figure 4:
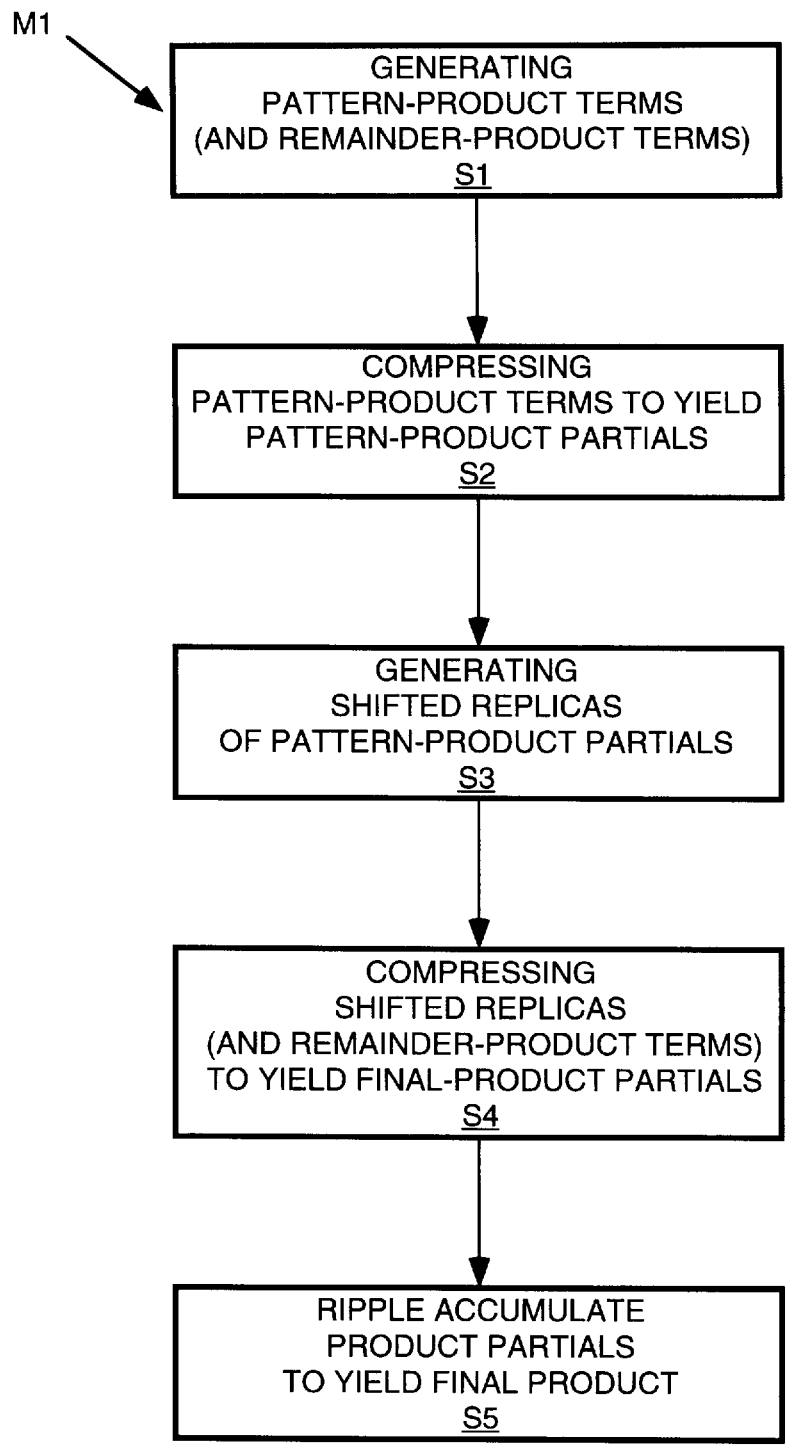
FIG. 4 is a flow chart of a method employed in the devices of FIGS. 1–3.

A method M1 of the invention, flow-charted in FIG. 4, is generally applicable to constant multiplication devices AP1, AP2, and AP3. Step S1 involves generating pattern-product terms and, if necessary, remainder-product terms. If all the non-zero digits of the pattern are positive, the pattern-product terms can be shifted versions of the multiplier. Likewise, if all remainder digits are positive, the remainder-product terms can be shifted versions of the multiplier. Negative digits can be handled in at least two ways. A compressor that handles subtraction can be used, in which case all product terms can be shifted versions of the multiplier. If the compressors are additive, two's complements can be generated—preferably, with the extra "1" added to a shifted version of the multiplier corresponding to a positive "1" in the pattern or remainder.

Step S2 involves compressing the pattern-product terms to yield pattern-product partials. The invention requires that the number of pattern-product terms be at least three and the number of pattern-product partials be at least two. Also, the number of pattern-product partials is to be less than the number of pattern-product terms. Preferably, the reduction is to two pattern-product partials. This is the result when an additive compressor yields a pseudo sum and a pseudo carry.

Step S3 involves generating shifted replicas of pattern-product partials. In general, each of the plural pattern-product partials is shifted the same number of times, that is, the number of times the pattern is repeated in the multiplier. Thus, the shifting of partials in done in "parallel" across the partials.

Step S4 involves compressing the shifted replicas. Each replica of each pattern-product partial is an input to this compression. In addition, each of any remainder-product term is also an input to this compression. The output of step S4 is a set of final-product partials, preferably a pseudo sum and a pseudo carry.

Step S5 involves accumulating the final-product partials using a ripple accumulator, normally, a carry-propagate adder, to yield the final product M*K. Depending on the number of inputs to be compressed, step S5 can involve multiple substeps; preferably only the last involves rippling. It should be noted that the rippling need not occur for some multiplicands, e.g., 0.

Patterns within patterns are dealt with as patterns in general. However, at step S4, the received replicas are used to build the incorporating pattern which is compressed in a first substep. Then, the resulting partials are replicated and shifted in a second substep. Finally, the incorporating pattern is compressed to yield the final-product partials at a third substep. More levels of subpatterns can be dealt with by adding stages to step S4.

Multipliers can have multiple patterns. These can be addressed by running sets of steps S2–S4 in parallel. The invention applies for both contiguous and non-contiguous patterns. Instances can be intersecting or non-intersecting. Incomplete instances of a pattern can be provided for (with resulting remainders), as long as a pattern has at least two complete instances. These and other variations upon and modifications to the described embodiments are provided for by the present invention, the scope of which is limited only by the following claims.

What is claimed is:

1. A constant multiplication device for multiplying a multiplicand by a constant multiplier having a repeating digit pattern with at least three non-zero values at respective digit positions, said multiplication device comprising:

a pattern-product term generator for generating pattern-product terms that collectively determine the product of said multiplicand and said pattern, at least one of said pattern-product terms being generated for each non-zero value of said pattern, said pattern-product term generator having an input for receiving said multiplicand;

a pattern-product compressor for calculating as a function of said pattern-product terms a set of pattern-product partials that collectively determine the product of said multiplicand and said pattern, said pattern compressor being coupled to said pattern-product term generator for receiving said pattern-product terms;

a replica generator for generating relatively shifted replicas of said pattern-product partials, said replica generator being coupled to said pattern compressor for receiving said pattern-product partials;

a replica compressor for calculating, at least in part as a function of said shifted replicas, final-product partials that collectively correspond to the product of said multiplicand and said multiplier, said replica compressor being coupled to said replica for receiving said shifted replicas; and a ripple accumulator for calculating said product from said final-product partials, said ripple accumulator being coupled to said replica compressor for receiving said final-product partials.

2. A multiplication device as recited in claim 1 wherein said pattern-product term generator also generates a set of remainder-product terms, said replica compressor calculating said set of final-product partials at least in part as a function of said remainder-product terms, said replica compressor being coupled to said pattern-term generator for receiving said remainder-product terms.

3. A multiplication device as recited in claim 1 wherein said compressors include carry-save adders and said ripple accumulator includes a carry-propagate adder.

4. A method of multiplying a multiplicand by a constant multiplier having a repeating digit pattern with at least three non-zero values at respective digit positions, said method comprising the steps of:

a) generating pattern-product terms for respective non-zero values of said pattern, b) using a compressor, calculating from said pattern-product terms pattern-product partials that collectively correspond to a product of said multiplicand and said pattern;

c) generating shifted replicas of said pattern pattern-product partials;

d) using a compressor, calculating at least in part as a function of said replicas final-product partials that collectively correspond to a product of said multiplicand and said multiplier; and e) using a carry-propagate adder, calculating said product of said multiplicand and said multiplier from said final product partials.

5. A method as recited in claim 4 wherein:

step a) also involves generating remainder-product terms corresponding to the non-zero values in the signed-digit format difference between the final product and the sum of all instances of said pattern in said multiplier; and step d) also involves calculating said final-product partials in part as a function of said remainder-product terms.

* * * * *